June 22, 1943.   J. A. TOFTEY   2,322,487
SWEEP RAKE STACKER AND LOADER
Filed July 8, 1940   2 Sheets-Sheet 1

INVENTOR.
JOSEPH A. TOFTEY
BY Maurice J. Fletcher
ATTORNEY.

June 22, 1943. J. A. TOFTEY 2,322,487
SWEEP RAKE STACKER AND LOADER
Filed July 8, 1940 2 Sheets-Sheet 2
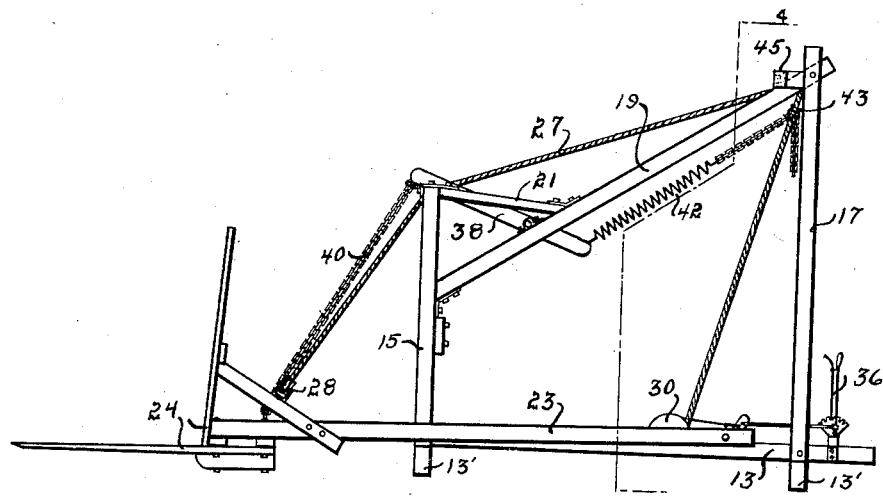
Fig. 3
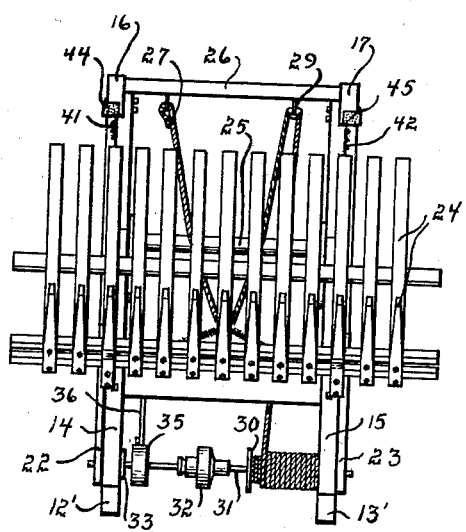
Fig. 5
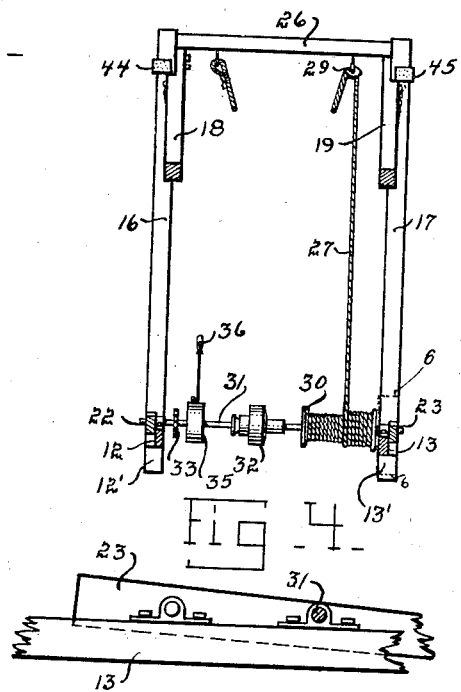
Fig. 4
Fig. 6
INVENTOR.
JOSEPH A. TOFTEY
BY Maurice J. Fletcher
ATTORNEY.

Patented June 22, 1943

2,322,487

UNITED STATES PATENT OFFICE 2,322,487

SWEEP RAKE STACKER AND LOADER

Joseph A. Toftey, Kanawha, Iowa

Application July 8, 1940, Serial No. 344,401

3 Claims. (Cl. 214—131)

The principal object of this invention is to provide a sweep rake stacker and loader which may be used as a stationary type of stacker or one which may be mounted on a tractor to form a mobile loader.

A further object of my invention is to provide a sweep rake stacker and loader wherein the gathering and stacking sweep arms are rigidly guided or placed during the entire sweep of the rake.

A still further object of this invention is to provide a loading and stacking mechanism which is completely counterbalanced and automatic in its return to operating position.

A still further object of this invention is to provide a sweep rake stacker and loader that is extremely economical in manufacture, durable and efficient in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 3 is a side elevational view of the stacker unit as it is used for a stationary stacker.

Fig. 4 is a front cross sectional view of the stacker unit taken on the approximate line 4—4 of Fig. 3.

Fig. 5 is a front elevational view of the sweep rake stacker and loader mechanism.

Fig. 6 is an enlarged view of a portion of the sill or beam of the device, showing the placement of the pivot points and bearing journals, and is taken on the line 6—6 of Fig. 4.

Figure 1:
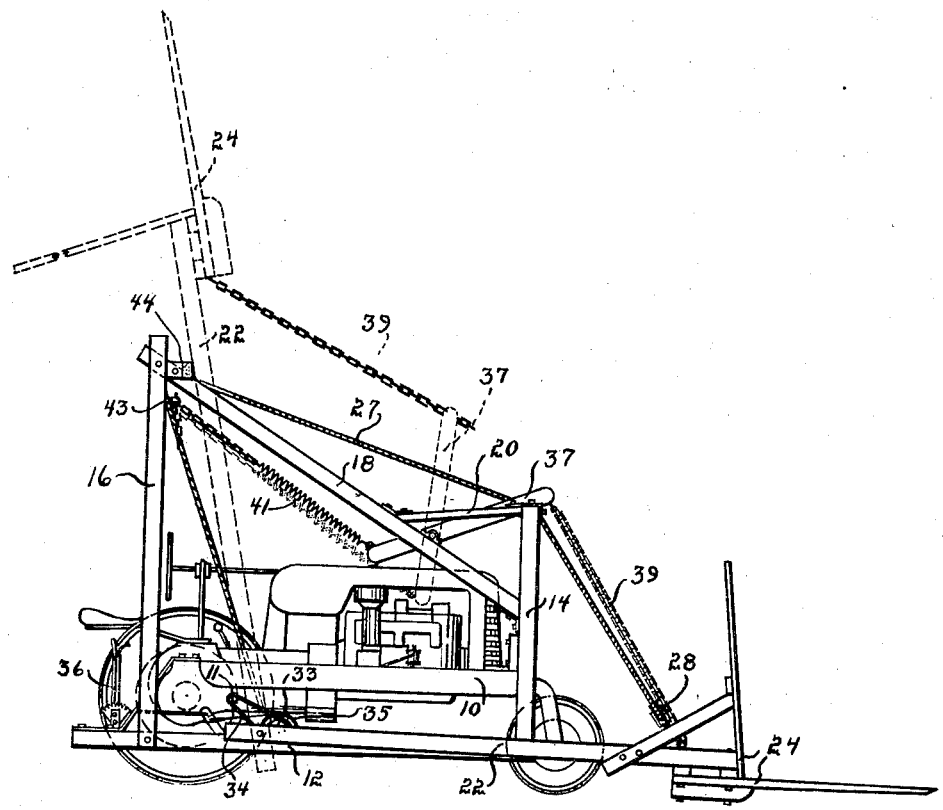
Fig. 1 is a side elevational view of my complete sweep rake stacker and loader mechanism mounted on a tractor ready for use.

There have been stacking devices on the market. These stacking devices were generally made so that they had to be mounted upon a tractor or the like, or were of such bulk and complication as to make their use limited in scope. Furthermore, with a sweep rake stacker, it has been found that all of these prior devices were extremely weak in structure, due to the fact that no bearing surface was provided for the pivoted arms. Also these stackers were extremely hard to mount on a tractor and dismount therefrom. Furthermore, these stackers were notoriously jerky and irregular in their function. I have overcome such disadvantages as will be appreciated and as will hereinafter be more fully set forth.

Referring to the drawings, I have used the numeral 10 to indicate a tractor having a power take-off connection or like 11. It is to such a tractor that I may attach my device, which I will now describe. I have used the numerals 12 and 13 to designate the frame of my sweep rake stacker and loader, which consists of two parallel beams spaced apart. The numerals 14 and 15 indicate two upright members secured to the forward ends of the beams 12 and 13 respectively, and having their outer faces on the same vertical plane as the outer faces of the beams or sills 12 and 13 respectively. The numerals 16 and 17 indicate two vertical beams having their lower ends secured adjacent the rearward end of the sills 12 and 13 respectively. The numeral 18 designates a frame member extending between the vertical member 14 and the vertical member 16 as shown in the drawings. The numeral 19 indicates a frame member extending between the vertical elements 15 and 17. These two frame or brace elements 18 and 19 have their outer faces on the same plane as the outer faces of the beams 12 and 14 and 13 and 15 respectively. Two parallel guide tracks are disposed on either side of the frame member so formed. The numerals 20 and 21 indicate braces which may be imposed between the upper ends of the vertical members 14 and 15, and the brace members or arms 18 and 19 respectively, as shown in the drawings.

Figure 2:
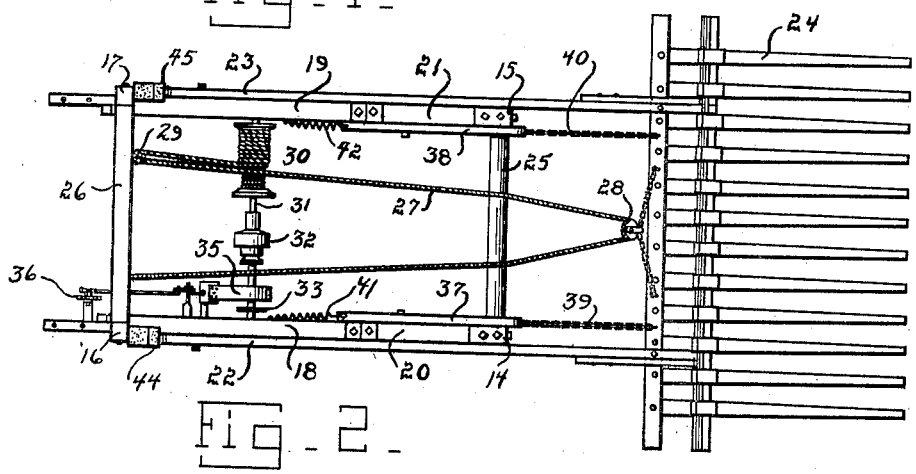
Fig. 2 is a top plan view of the stacker unit.

I have used the numerals 22 and 23 to designate two arms having their rearward ends pivotally secured to the frame members 12 and 13 respectively and extending forwardly. The numeral 24 indicates a toothed hay buck or gatherer secured to the forward ends of the arms 22 and 23. I have used the numeral 25 to designate a roller element rotatably suspended between the upper ends of the vertical members 14 and 15 as shown in Fig. 2 of the drawings. The numeral 26 designates a cross beam secured between the upper ends of the vertical members 16 and 17. To this beam 26 I secure one end of a rope, cable or like 27, which passes over the roller 25, through a pulley 28, which is in turn secured to the buck or gatherer 24, and thence back over the roller 25 through a pulley 29 secured to the beam 26. The other end of the rope 27 is secured to a windlass drum 30 as shown in Fig. 2. The numeral 31 indicates a shaft rotatably mounted between the frame members or beams 12 and 13 and to which the drum 30 is secured. The numeral 32 indicates a slip clutch placed in the shaft 31 and this clutch is of the ordinary friction type permitting the shaft to rotate after a certain amount of resistance is encountered. The numeral 33 indicates a sprocket gear secured to the shaft 31 on the opposite side of the clutch 32 from the drum or windlass 30. This sprocket gear in turn is operatively secured to the power take-off 11 of the tractor 10 through the medium of a chain 34. I have used the numeral 35 to indicate a friction brake mechanism of the ordinary type, which employs a friction belt contacting a drum on the shaft 31 and operated by a manually controlled lever member 36. The numerals 37 and 38 indicate two balance arms pivoted to the members 18 and 19 respectively at a point below the center of the arms 37 and 38. The numerals 39 and 40 indicate chains having one of their ends secured to the beams 37 and 38 respectively, and their other ends secured to the toothed rake member 24, as shown in the drawings. Secured to the other ends of the arms 37 and 38 are the compression springs 41 and 42. These springs 41 and 42 extend upwardly and backwardly and have their other ends secured to a chain, which in turn is adjustably secured through the medium of the hook members 43, to the upright members 16 and 17 respectively as shown in the drawings. I have used the numerals 44 and 45 to indicate two bumper elements secured adjacent the upper ends of the uprights 16 and 17 and which are contacted by the arms 22 and 23 when the rake 24 is in its uppermost position.

The practical operation of my device is as follows:

The device is attached to a tractor as shown in Fig. 1 or placed upon the ground as shown in Fig. 3. When placing the device on the ground as a stationary stacker, it may be desirable to use the short foot or support members 12' and 13' for elevating the device as shown in Fig. 3, Fig. 4, and Fig. 5 of the drawings. The tractor is then moved forward and the grain or other substance desired to be loaded or stacked is picked up on the rake member 24. The power take-off 11 is then manipulated so that it is in gear with the tractor, causing the rope 27 to wind on the drum 30, raising the arms 22 and 23 to the position shown by dotted lines in Fig. 1, at which time the material collected on the rake 24 will be deposited in a wagon, stack or the like. Due to the length of the chains 39 and 40, the arms 22 and 23 will be pulled against the tension of the springs 41 and 42 after the arms 22 and 23 have passed the vertical so that when the power take-off is reversed or disconnected, the springs 41 and 42 acting on the arms 37 and 38 will, through the medium of the chains 39 and 40, pull the rack 24 back beyond the vertical line after which the weight of rake will cause it to fall to its normal operating position. During this operation, the inside surface of the arm 22 will be in contact all times with at least one of the frame members 12, 14 or 18, and likewise the arm 23 will have its inside surface in contact with at least one of the frame members 13, 15 or 19, thus preventing the misalignment of the rake 24, and providing a positive guide for the moveable arms 22 and 23 at all points of their rotation. As the rake member 24 reaches its uppermost position, the arms 22 and 23 strike the bumper members 44 and 45 respectively, and if the operator does not shut off the power take-off, the friction clutch 32 merely slips until such time as it is reversed and brought back to its carrying position. The brake member 35 may be used to stop the action of the arms and may be used to hold the rake 24 in a slightly elevated position while the tractor is carrying the material loaded on the buck or rake 24 to the point of deposit. The same action occurs when the device is used as a stationary stacker. The straw, hay or other material is placed on the rake 24 and the wheel 33 may be operatively secured to a suitable source of power, or the rope 27 may be manually pulled or pulled by horses or the like to raise the stacking unit to its unloading position. The stacker may be secured to the tractor in any suitable manner when used as a mobile unit and due to the large open space free of obstructions, it is very easy to attach the device to a tractor.

Thus it will be seen that I have provided a sweep rake stacker and loader wherein the arms supporting the toothed rake member have a positive guide during the entire pivoting movement, thus providing direct alignment for the toothed rake 24 at all times and preventing it from wobbling or vibrating out of alignment. The spring members 41 and 42 may be adjusted at the will of the operator, by merely linking the proper link of the chains onto the hooks 43. My stacker may be used either stationary or secured to a tractor, and is flexible and versatile in its operation.

The parts comprising the vertical member 14 and the arm 18 will hereinafter be referred to as a guide track and the elements comprising the vertical member 15 and the member 19 will also be referred to as a guide track. The beams 12 and 13 will be referred to as a frame, and the parts comprising the arms 37 and 38, the chains 39 and 40, and the springs 41 and 42 will be referred to as a return mechanism.

Some changes may be made in the construction and arrangement of my improved sweep rake stacker and loader without departing from the real spirit and purpose of my invention, and it is my intention to cover by my claims any modified forms of structure or use of mechanical equivalents which may be reasonably included within their scope.

I claim:

1. In a device of the class described, a frame member designed to be mounted on a tractor, a shaft rotatably mounted in said frame and operatively connected to the power take-off of the tractor, a drum member on said shaft, a vertical guide track on said frame, a sweep rake assembly comprising a toothed rake and arms, a means for pivotally securing said arms to said frame so that said arms will rest adjacent said guide track, pulleys mounted on said vertical guide member, a rope wound upon said drum extending over said pulleys and secured to said sweep rake whereby the rotation of said shaft will elevate said sweep rake, a pivoted arm member secured to said vertical guide track, a spring element imposed between one end of said arm and said frame, and a chain member secured between the other end of said pivoted arm and said toothed rake for returning said toothed rake to a lowered position after said toothed rake has reached its discharge position.

2. In a device of the class described, a frame member designed to be mounted on a tractor, a shaft rotatably mounted in said frame and operatively connected to the power take-off of the tractor, a drum member on said shaft, a vertical guide track on said frame, a sweep rake assembly, arms extending from said sweep rake assembly, a means for pivotally securing said arms to said frame so that said arms rest adjacent and contact said guide track during the pivotal movement of said arms, a rope having one end secured to and operated by said drum member and having its other end operatively connected to said sweep rake assembly; said assembly being such that the rotation of said shaft will elevate said sweep rake, a pivoted arm member secured to said vertical guide track, a yielding element imposed between one end of said arm and said frame, and a means secured between the other end of said pivoted arm and said sweep rake assembly for returning said sweep rake to a lowered position after said sweep rake has reached its discharge position.

3. In a device of the class described, a frame member designed to be mounted on a tractor, a shaft rotatably mounted in said frame and operatively connected to the power take-off of the tractor, a drum member on said shaft, a vertical guide track on said frame, a sweep rake assembly, arms extending from said sweep rake assembly, a means for pivotally securing said arms to said frame so that said arms rest adjacent and contact said guide track during the pivotal movement of said arms, a rope having one end secured to and operated by said drum member and having its other end operatively connected to said sweep rake assembly; said assembly being such that the rotation of said shaft will elevate said sweep rake, a pivoted arm member secured to said vertical guide track, and a means secured between the other end of said pivoted arm and said sweep rake for returning said sweep rake to a lowered position after said sweep rake has reached its discharge position.

JOSEPH A. TOFTEY.